July 19, 1932. A. J. WEATHERHEAD, JR 1,868,037

METHOD OF PRODUCING ANGLE FITTINGS

Filed April 13, 1927  2 Sheets-Sheet 1

Inventor
A. J. WEATHERHEAD JR
By
Fisher, Moser & Moore
Attorney

July 19, 1932.  A. J. WEATHERHEAD, JR  1,868,037
METHOD OF PRODUCING ANGLE FITTINGS
Filed April 13, 1927  2 Sheets-Sheet 2

Inventor
A. J. WEATHERHEAD JR.
By
Fisher Moser & Moore
Attorney

Patented July 19, 1932

1,868,037

UNITED STATES PATENT OFFICE

ALBERT J. WEATHERHEAD, JR., OF CLEVELAND, OHIO

METHOD OF PRODUCING ANGLE FITTINGS

Application filed April 13, 1927. Serial No. 183,369.

My invention relates to a method of producing pipe couplings, fittings, and the like, my object in general being to produce an exceptionally good machined article of that kind in a facile and economical way, all as hereinafter shown and described and more particularly pointed out in the claims.

Figure 1:
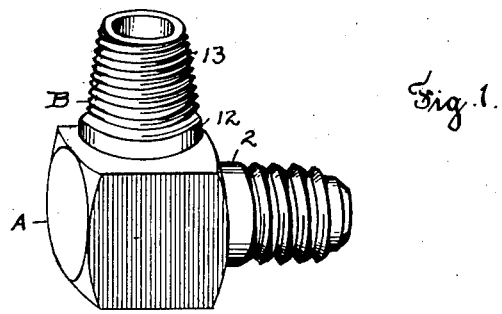
Figure 2:
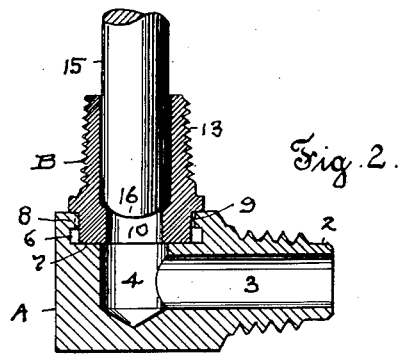
Figure 3:
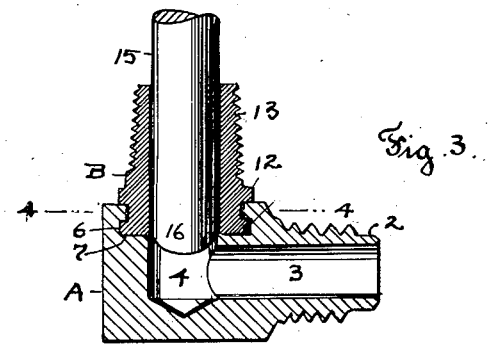
Figure 5:
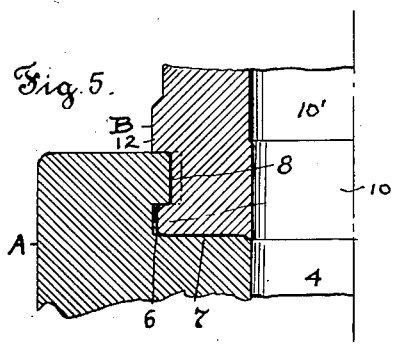
Figure 4:
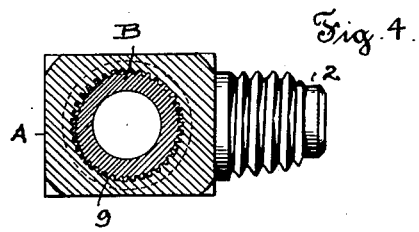
Figure 6:
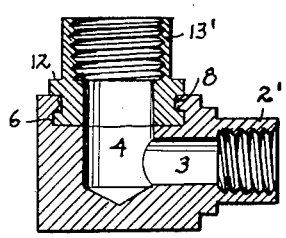

In the accompanying drawings, Fig. 1 is a perspective view of an elbow coupling or fitting constructed according to my invention, and Figs. 2 and 3 are sectional views thereof, showing the expanding tool therein, as used finally in producing the article. Fig. 4 is a horizontal section of the fitting on line 4—4 of Fig. 3. Fig. 5 is an enlarged sectional detail of the finished joint. Fig. 6 is a sectional view of a modified form of elbow fitting embodying the invention. Figs. 7 to 16, sheet 2, are sectional views and elevations of the two pieces or parts used to produce a fitting as they appear in different stages of their production, all as hereinafter more specifically described.

The present invention is especially useful in connection with small elbows, T's or angle fittings, for example, screw fittings or couplings made of brass and designed to couple tubes or pipes of small diameter together or to connect a tube or pipe to some other article adapted to distribute a fluid or liquid, such as oil, air, etc. A common practice is to cast or mold such angle fittings in one piece, and screw-thread the extremities or branches thereof separately. Such proceedings involve individual handling of the fittings and repeated operations thereon by skilled workmen, and the cost of production is accordingly high considering the small size and nominal value of each article produced. My aim is to eliminate casting or molding operations altogether and use extruded stock exclusively, producing therefrom by automatic screw machine operations separate finished pieces adapted to be united inseparably together in angular relation with fluid-tight sealing and interlocking effect.

Figure 7:
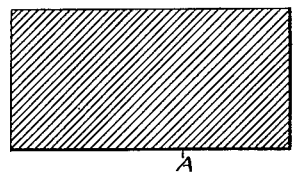
Figure 12:
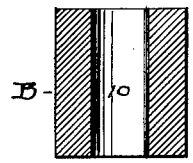
Figure 8:
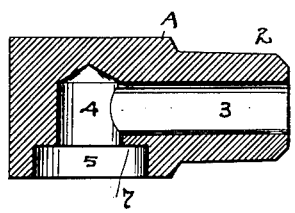
Figure 13:
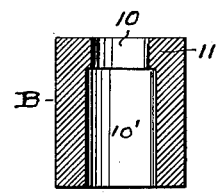
Figure 9:
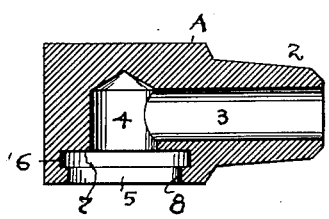
Figure 14:
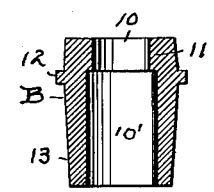
Figure 10:
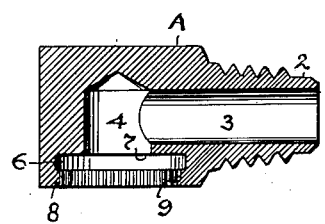

Thus the invention comprises an angle fitting made of two separate pieces A and B, respectively. The main piece or body A is cut to a predetermined length from bar stock or a solid rod, which may be square in cross section. Beginning with such a solid piece A, as shown in Fig. 7, one end thereof is turned round to provide a cylindrical branch 2. This branch is screw-threaded for a part of its length, and the screw-thread may be formed externally on a tapering branch 2, as shown in Fig. 10, or internally on a straight branch 2' as illustrated in Fig. 6. Member A is also drilled at right angles to provide two communicating bores or fluid passages 3 and 4, respectively. Bore 3 extends longitudinally of branch 2, and bore 4 extends transversely of body A. Bore 4 is closed at its inner end and counterbored at its outer end 5 at one flat side of said body, see Fig. 8. The circular wall of counterbore 5 is undercut to provide an annular groove or channel 6 opposite a flat shoulder portion 7 at the base of the counterbore, thereby also producing an inwardly-extending flange 8 annularly at the mouth of said counterbore, see Fig. 9. This flange is then serrated or punched with fine teeth 9, as delineated in Figs. 10 and 11.

Figure 15:
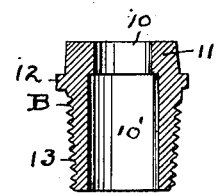
Figure 11:
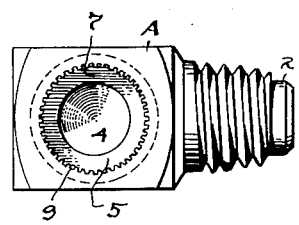
Figure 16:
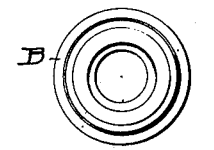

The separate piece or branch member B is also cut to a predetermined length from bar or rod stock, and this piece is drilled lengthwise to form a tube, or short pieces of drawn tubing may be used instead. The round bore 10 in this tubular piece is then drilled for the major part of its length, leaving a thicker zone or neck 11 at one end thereof, see Fig. 13. An annular shoulder or collar 12 is also formed externally of this piece by removing part of the stock or reducing the diameter of the piece externally at each end. The opposite ends are relatively long and short, collar 12 being preferably formed adjacent the base of neck 11 or the inner end of the enlarged or broached part 10' of bore 10, see Fig. 14. The longer end 13 of piece B may be tapered and then screw-threaded externally as shown in Fig. 15, or this end may be made straight and screw-threaded internally as shown at 13' in Fig. 6, to permit a screw connection to be made with a pipe, tube or other article.

Having two finished pieces or parts A and

B as described, the next step in operations is to assemble and secure them tightly together. This may be accomplished by inserting neck 11 of piece B into the serrated counterbore 5 in one side of body piece A until collar 12 is seated against the flat side thereof. A round tool 15 is then inserted into the broached or enlarged part of bore 10 of piece B and pressure is applied to force its rounded extremity 16 through the reduced part of the bore, thereby expanding neck 11 until the stock at the extremity of the neck is crowded into the annular groove or channel 6 in body piece A. The stock in neck 11 opposite the serrated flange 8 is also compressed and crowded by tool 15 against the sharp edged teeth or serrations and into the interspaces between the teeth, thereby sealing the joint between pieces A and B and also locking the piece B effectively against independent rotative movement. Locking of piece B to piece A is especially desirable as this part or piece is subjected to torsional stresses in making screw-connections with a pipe or other part. When the pieces are joined together as stated, the finished passage in the angularly-extending piece B is of the same or substantially the same diameter as bore 4 in body piece A, and a free unobstructed passage is afforded at the joint.

What I claim is:

1. A method of producing angle fittings, consisting in forming a zone of increased thickness at one end of a tubular part; forming a passage with a counterbored entrance; channeling the annular wall of said counterbored entrance parallel with respect to the axis of said passage; and expanding the said end of said tubular part within said entrance with non-rotatable fluid-tight interlocking engagement with said wall.

2. A method of producing angle fittings, consisting in forming a collar and screw-threads on opposite ends of a tubular part; in forming a counterbored passage in a second part and fluting and channeling the counterbored part of said passage parallel with the axis thereof; in inserting the collar end of said tubular part into the counterbore of said second part and pressing said parts tightly together to effect a fluid tight, non-rotatable interlocking engagement of said parts.

In testimony whereof I affix my signature.

ALBERT J. WEATHERHEAD, Jr.